United States Patent [19]

Mori

[11] Patent Number: 4,626,986
[45] Date of Patent: Dec. 2, 1986

[54] PROCESSOR HAVING PLURAL INITIAL LOADING PROGRAMS FOR LOADING DIFFERENT OPERATING SYSTEMS

[75] Inventor: Shosuke Mori, Tokyo, Japan

[73] Assignee: Fujitsu Limited, Kawasaki, Japan

[21] Appl. No.: 827,678

[22] Filed: Feb. 10, 1986

Related U.S. Application Data

[63] Continuation of Ser. No. 752,008, Jul. 5, 1985, abandoned, which is a continuation of Ser. No. 664,090, Oct. 24, 1984, abandoned, which is a continuation of Ser. No. 333,808, Dec. 23, 1981, abandoned.

[30] Foreign Application Priority Data

Dec. 29, 1980 [JP] Japan ................................ 55-187950

[51] Int. Cl.⁴ .......................... G06F 9/40; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,135,240 | 1/1979 | Ritchie | 364/200 |
| 4,164,786 | 8/1979 | Gollomp | 364/200 |
| 4,167,781 | 9/1979 | Beccia et al. | 364/200 |
| 4,200,930 | 4/1980 | Rawlings et al. | 364/200 |
| 4,253,148 | 2/1981 | Johnson et al. | 364/200 |
| 4,282,572 | 8/1981 | Moore, III et al. | 364/200 |
| 4,325,118 | 4/1982 | DeVita et al. | 364/200 |

Primary Examiner—Gary V. Harkcom
Attorney, Agent, or Firm—Staas & Halsey

[57] ABSTRACT

An information processor with a read only memory ROM stores a plurality of initial program loader (IPL) programs. The ROM memory has address inputs divided into two parts used to access each IPL program. One part of the address inputs of the ROM memory is connected to an address bus from a central processing unit (CPU) in order to be used to access the contents of one of the programs. The other part of the address inputs of said ROM memory is connected to an IPL setting part or switching which sets or selects a desired one of said plurality of IPL programs. The IPL setting part includes a plurality of switches connected to upper bit terminals of the ROM address inputs.

6 Claims, 15 Drawing Figures

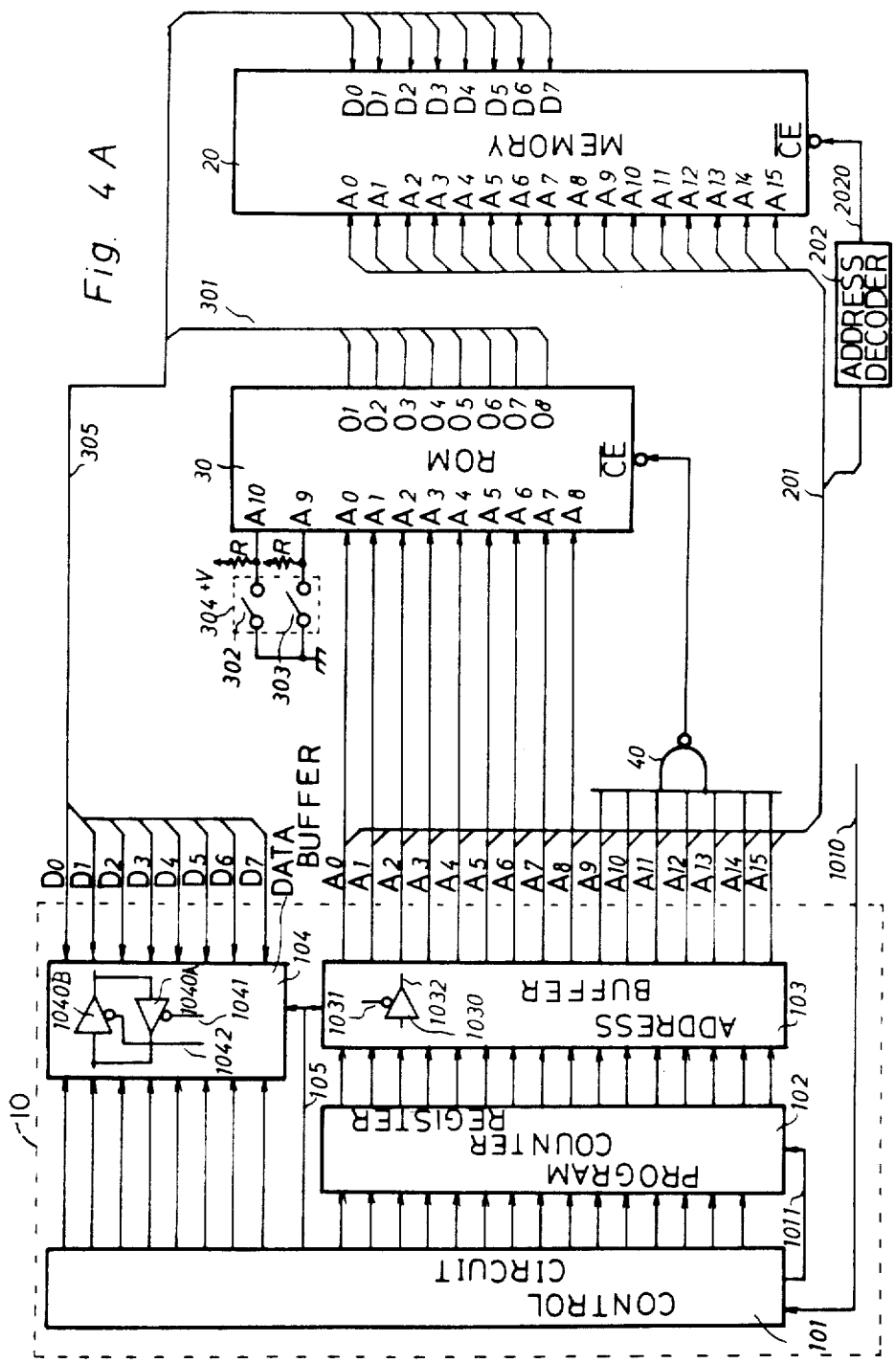

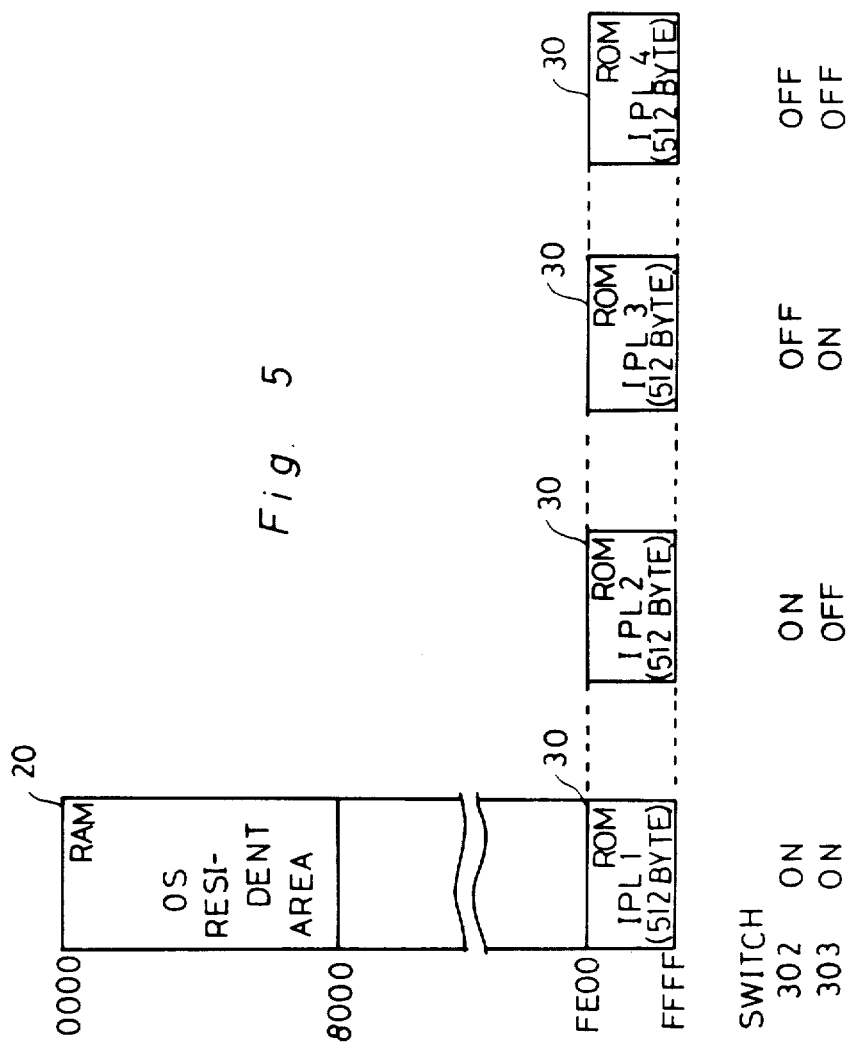

PROCESSOR HAVING PLURAL INITIAL LOADING PROGRAMS FOR LOADING DIFFERENT OPERATING SYSTEMS

This is a continuation of co-pending application Ser. No. 752,008, now abandoned, filed on July 5, 1985 which is a continuation of Ser. No. 664,090, now abandoned, filed on Oct. 24, 1984 which is a continuation of Ser. No. 333,808, now abandoned, filed on Dec. 23, 1981.

BACKGROUND OF THE INVENTION

This invention relates to an information processor, such as microcomputer, which has a plurality of initial program loaders (IPL) each serving to start the corresponding one of different operation systems (OS's) after a central processing unit (CPU) has been reset or after a power supply has been turned "on".

Conventional microcomputers have only one type of IPL mode, and can start only one type of OS. In a case where it is desired to start any one of different OS's including, for example, a floppy disk, microdisk, digital cassette, etc. after resetting the OS or after turning "on" a power supply, an operator manipulates the microcomputer on those occasions.

In general, as shown in FIG. 1, a computer system has an arrangement of a microprocessor unit (MPU) in which a main memory 2, and an input/output interface (I/O IF) circuit 5 connected to peripheral equipment units 3 are inter-connected by buses 4 for addresses and data. The peripheral equipment 3 connected to the I/O IF 5 is, for example, a floppy disk (FD), or a microdisk (MD), etc. In such a computer system, each place of the peripheral equipment operates under a control peculiar thereto. After any peripheral equipment unit has been reset or after a power supply has been turned "on", the CPU 1 must execute an initial program loader (IPL) program for starting the peculiar control. In the prior art, such peculiar IPL records are stored in a lowerbit address area of the main memory 2 in individually divided IPL storage areas. The address space of the main memory 2 is illustrated in FIG. 2.

When the power supply has been turned "on", the CPU 1 loads an address FFFE of 16 bits as a memory address in a hardware fashion and fetches the corresponding memory content "FA". Subsequently, it increments a program counter to a count value corresponding to an address FFFF and thus fetches a corresponding memory contents "00". A signal "FA00" in a form in which the aforecited two information or contents are combined is put on the address bus so as to appoint the address FA00 of the main memory 2. Then, the operation of selecting the IPL record is started.

As shown in FIG. 2, a program for selecting any of the IPL records is stored at the address FA00. It is executed in order to select the predetermined IPL record. By way of example, in a case where contents IPL 2 stored in an address FC00 is to be fetched, this record IPL 2 is moved to an OS area which lies in the upper-bit address part of the main memory 2. Thus, the peripheral equipment 3 corresponding to the contents IPL 2 is initialized. With the prior art, accordingly, all the plurality of peculiar IPL programs have to be stored in the lower-bit part or ROM part of the main memory 2. The expedient of selecting the operation systems OS1, OS2 and OS3 by using the selecting program involves the disadvantage that the operating speed is low.

An alternative expedient is illustrated in FIG. 3. After an IPL program has been loaded, that is to say, after an initial program has been stored into a main memory, an operator sets through a console which of the OS's is to be used. Thus, the operation system, for example, OS1, OS2 or OS3 is selected with the program. In the presence of a plurality of IPL modes, accordingly, IPL programs which are equal in number to the modes must be stored in the ROM area of the main memory, in other words, in the form of ROM contents. Therefore, the area of the main memory which the user can utilize ("0"~"FA00") lessens to that extent.

SUMMARY OF THE INVENTION

An object of this invention is to eliminate the disadvantages in the prior art, and to provide an information processor which can efficiently use a plurality of IPL (initial program loader) programs stored in a fixed memory and which permits respective OS's (operation systems) to be started independently of one another when a central processing unit has been reset or a power supply has been turned "on".

Accordingly to one aspect of performance of this invention, an information processor having a plurality of initial program loader (IPL) programs which are executed by a central processing unit when the operations of the central processing unit are initiated and which load desired execution programs into a memory. The invention also includes a memory for exclusive IPL program use which stores said plurality of IPL programs therein. Some of address terminals of said memory for exclusive IPL use being connected to said central processing unit through an address bus. Said central processing unit setting address bits corresponding to said some address terminals. Additionally included is an IPL setting part which sets a desired one of said plurality of IPL programs to be addressed by the operation system. The remaining address terminals of exclusive IPL memory being connected to said IPL setting part. Said IPL setting part setting address bits corresponding to said remaining address terminal.

BRIEF DESCRIPTION OF THE DRAWINGS

FIG. 4A is a circuit diagram of an information processor embodying this invention, FIG. 5 is a memory map diagram of a main memory included in the embodiment.

DETAILED DESCRIPTION OF THE PREFERRED EMBODIMENTS

Hereunder, embodiments of this invention will be described in detail with reference to the drawings.

Figure 1:
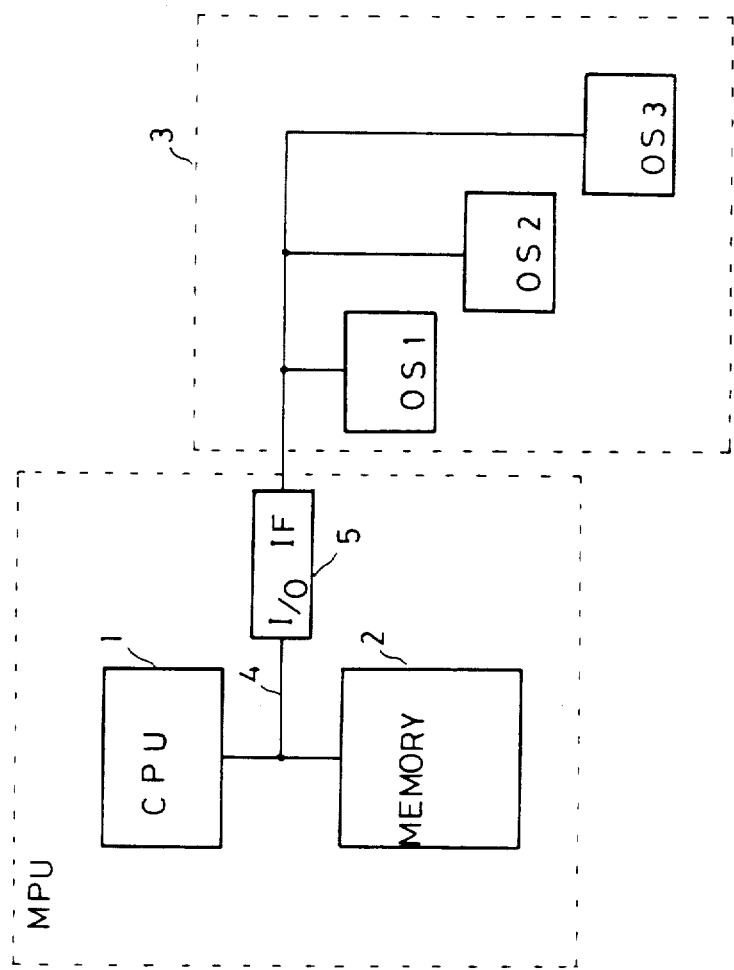
FIG. 1 is a block diagram illustrating a conventional computer system.
Figure 2:
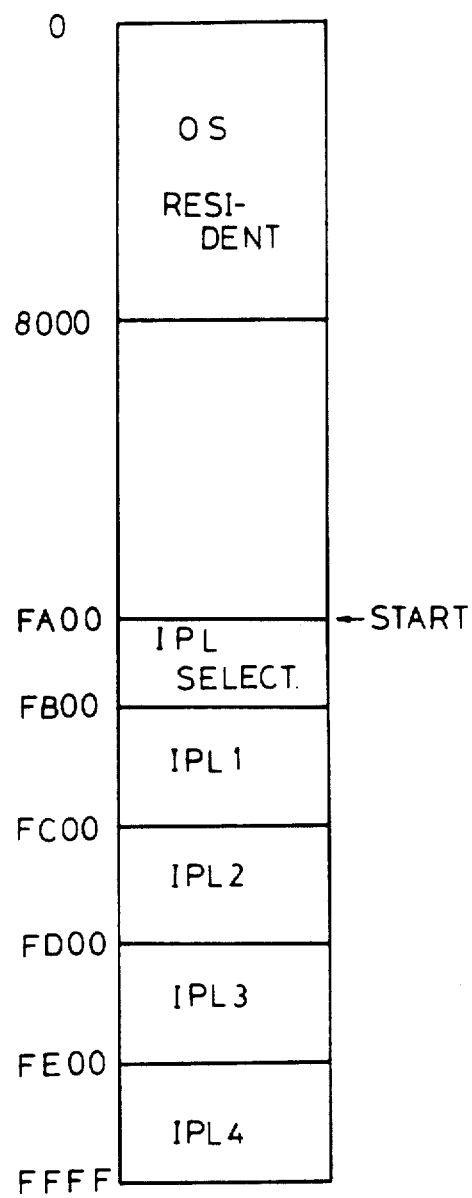
FIG. 2 is a diagram illustrating address space of a main memory in the computer system of FIG. 1.
Figure 3:
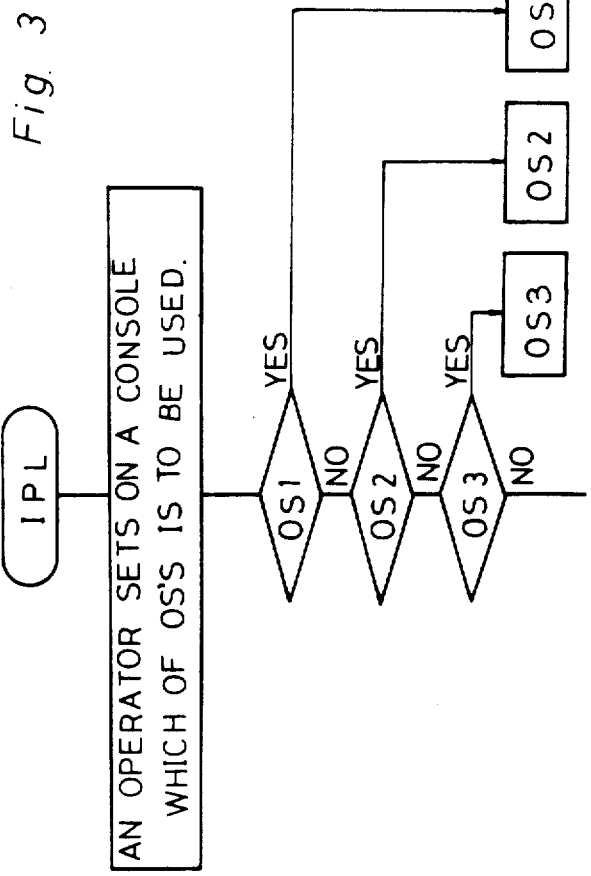
FIG. 3 is a flow diagram used for explaining the conventional system.
Figure 4B:
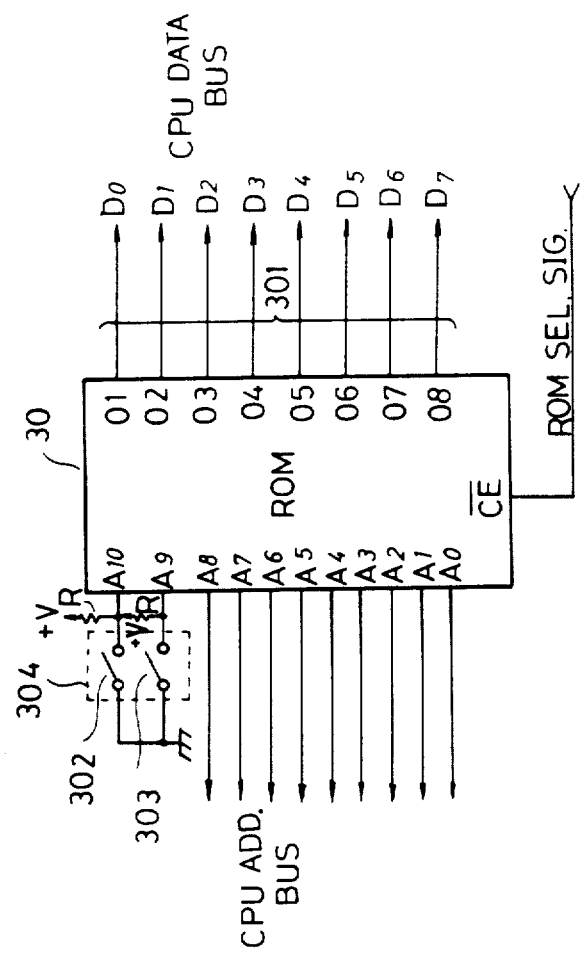
FIG. 4B is a detailed connection diagram of portions of the embodiment, illustrated in FIG. 4A
Figure 6:
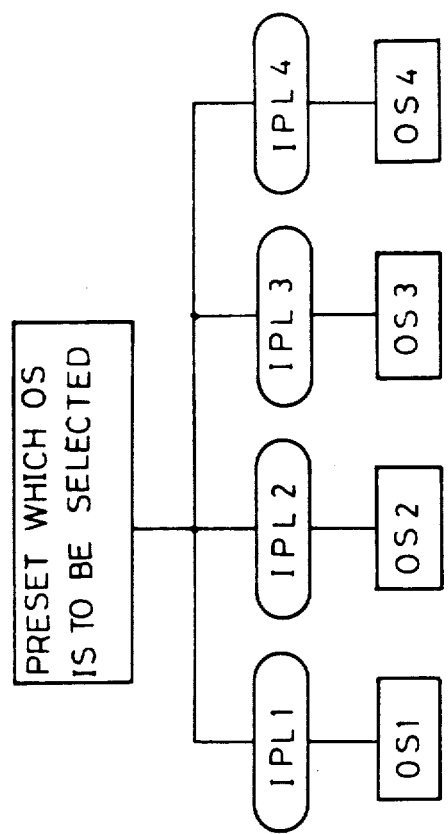
FIG. 6 is a diagram used for explaining an aspect of starting an operation system in the embodiment.

As shown in FIG. 4A, an information processor embodying this invention includes data lines of 8 bits $D_0-D_7$ which connect a CPU 10 and a main memory 20, and a ROM 30 which is a fixed memory for exclusive IPL use and is connected to address lines $A_0-A_{15}$. In the present embodiment, the ROM 30 for exclusive IPL use is composed of, for example, four memory storage areas each of which includes 512 bytes appointed by the 9 bits of the address lines $A_0-A_8$ and which are respectively appointed by the 2 bits of the address lines $A_9$ and $A_{10}$. Thus, the ROM 30 has a total memory capacity of 512 bytes × 4. One IPL record or program is stored in total in each 512 bytes. In the 16-bit address bus ($A_0-A_{15}$) which connects the CPU 10 and the main memory 20 (FIG. 4A), the address lines $A_0-A_8$ of the lower 9 bits are directly connected to the address inputs $A_0-A_8$ of the ROM 30 (FIG. 4B). As shown in FIG. 4B, the address bits $A_9$ and $A_{10}$ of the IPL ROM 30 are connected to two IPL selecting switches 302 and 303 disposed in an IPL selection part or unit 304. The address bit $A_{10}$, for example, is forced to become logic "0" when the switch 302 is turned "on", and is fed with a supply voltage V through a resistor R, and forced to become logic "1" when the switch is turned "off". Accordingly, four IPL modes or storage areas can be selected by utilizing the "on" and "off" states of the two switches 302 and 303. As seen from FIG. 4A, the chip enable terminal $\overline{CE}$ of the IPL ROM 30 receives a signal obtained by decoding the 7 bits $A_9-A_{15}$ of the address bus by means of a decode circuit or NAND circuit 40. When the 7 bits of the lines $A_9-A_{15}$ are "all 1's", the logic "1" is applied to the chip enable terminal $\overline{CE}$, and the IPL ROM 30 falls into the enable state. This measure is taken in order that, when the signal of the address bus of 16 bits lies in a range of from FE00 to FFFF in terms of a hexadecimal number, the IPL ROM 30 may become the enabled state and have its content fetched onto a data line 301.

In the above embodiment of this invention, accordingly, the map of the memory space of the main memory 20 is as shown in FIG. 5. In a case where the address bus of 16 bits is appointing FE00 to FFFF in the hexadecimal system, the ROM 30 for the exclusive IPL use is chip-enabled instead of the appointment of the content of the main memory 20, and the data in the ROM 30 are effectively fetched onto the data line 301 in accordance with the 9 bits $A_0-A_8$ applied to the ROM 30.

The actual capacity of the ROM 30 which is the fixed memory for exclusive IPL use is 512 × 4 bytes. However, when the ROM is viewed from the CPU side, the address bits to be afforded are $A_0-A_8$, and hence, the ROM capacity is only 512 bytes. Any one of the four divided memory storage areas, each having 512 bytes, within the ROM 30 is selected by setting the upper bits $A_9$ and $A_{10}$ of the ROM 30 by means of the IPL setting part 304. Accordingly, the CPU is only required to appoint the part of the IPL memory areas FE00-FFFF which are kept fixed. This renders the operation very simple.

As shown in FIG. 5, the embodiment has four IPL programs, each of which consists of 512 bytes at maximum. When fetching the program IPL 1, the switches 302 and 303 connected to the address lines $A_{10}$ and $A_9$ of the IPL ROM 30, as shown in FIG. 4B, are both brought into the "on" states so as to put logic (00) into the ROM 30 in advance. Then, the 512 bytes or 512 words of the ROM 30 are appointed by the lower-bit address $A_0-A_8$ transmitted from the CPU 10, and the program content IPL 1 is fetched onto the data bus 301. Likewise, in the memory map of FIG. 5, the initial programs IPL 2, IPL 3 and IPL 4 each consisting of 512 bytes (words) at maximum can be fetched by setting the switches 302 and 303 into ("on", "off"), ("off", "on") and ("off", "off"), respectively.

In the embodiment, accordingly, any desired OS can be automatically started by presetting any of OS1, OS2, OS3 and OS4 in correspondence with the "on" and "off" states of the switches 302 and 303.

Referring to FIG. 4A again, the central processing unit (CPU) 10 which generates the address bit signals of the ROM 30 for exclusive IPL use sets in a program counter register 102 the signals from 16 address bits which are generated under the control of a control circuit 101 or by activating a program counter load signal 1011. The 16-bit address signals are sent through a tristate type address buffer circuit 103 which is connected to the program counter register 102. As stated before, when the address bits $A_9-A_{15}$ are "all 1's", the IPL ROM 30 is enabled by the NAND circuit 40, one of the four IPL programs each consisting of 512 bytes is set by the IPL setting or selecting part 304, and the content of the IPL program appointed by the information of the address bits $A_0-A_8$, being the outputs of the address buffer circuit 103 of the CPU 10, is delivered onto the data line 301. This program content passes along a data bus 305 and is sent through a data buffer circuit 104 of the CPU 10 to the control circuit 101, in which the predetermined IPL operation is executed. The control circuit 101 controls by the use of buffer control signals 105 of the data buffer circuit 104 and the address buffer circuit 103. This will be discussed for one tristate buffer circuit 1030 in the address buffer circuit 103. When an enable terminal 1031 is brought to logic "1", an output line 1032 connected to one of the 16-bit address lines falls into its high impedance state. On the other hand, when the control terminal 1031 is brought to logic "0", the buffer circuit 1030 falls into its enabled state and permits the contents of the corresponding bit of the program counter register 102 to be transmitted to the corresponding one of the address lines $A_0-A_{15}$.

Regarding the data buffer circuit 104, a buffer circuit 1040 included therein in correspondence with 1 bit of data is composed of an input buffer circuit 1040A for controlling the input direction of the data and an output buffer circuit 1040B for controlling the output direction thereof. In passing the 8-bit data $D_0-D_7$ into the CPU, an enable terminal 1041 of the input buffer circuit 1040A is brought to logic "0" and an enable terminal 1042 of the output buffer circuit 1040B to logic "1" by the use of the buffer control signal 105. Then, the data is put into the CPU 10 through the input buffer circuit 1040A. Conversely, when it is desired to pass the data out of the CPU 10, the enable terminal 1042 is brought to the logic "0" and the enable terminal 1041 to the logic "1", to render the buffer circuit 1040B enabled and the buffer circuit 1040A disabled. Then, the data sent from the control circuit 101 is transmitted onto the data bus 305 through the output buffer circuit 1040B.

In a case where at least one of the address bits $A_9$–$A_{15}$ is logic "0", in other words, where the address sent from the CPU lies outside the range of from FE00 to FFFF, the ROM for exclusive IPL use 30 is not used. In this case, the memory 20 for OS and user's areas is accessed in such a way that the signals of the 16 address bits $A_0$–$A_{15}$ sent from the CPU are transmitted to the memory 20 through an address bus 201. Then, the content of the appointed OS is fetched and applied to the CPU through the data bus 305. In addition, the memory 20 for OS areas has its chip-enable state determined by a signal 2020 which is obtained by decoding appropriate bit information of the address bits $A_0$–$A_{15}$ by means of an address decoder 202. Further, the control circuit 101 of the CPU 10 is reset and initialized by a reset signal 1010.

The foregoing embodiment employs the ROM for exclusive IPL use, which brings forth another beneficial result. As the address space in the main memory, the prior art has required the memory areas IPL 1–IPL 4 or 512 words×4. In contrast, according to the embodiment, the address space of a main memory area for storing the IPL records decreases to the 512 bytes of from FE00 to FFFF.

Moreover, in a case where it is desired to start any one of different OS's after the CPU has been reset or after the power supply has been turned "on", the embodiment is furnished with the plurality of IPL programs and allows the respective OS's to start independently of one another. It is accordingly possible to start the plurality of OS's without manipulation by the operator.

Figure 7:
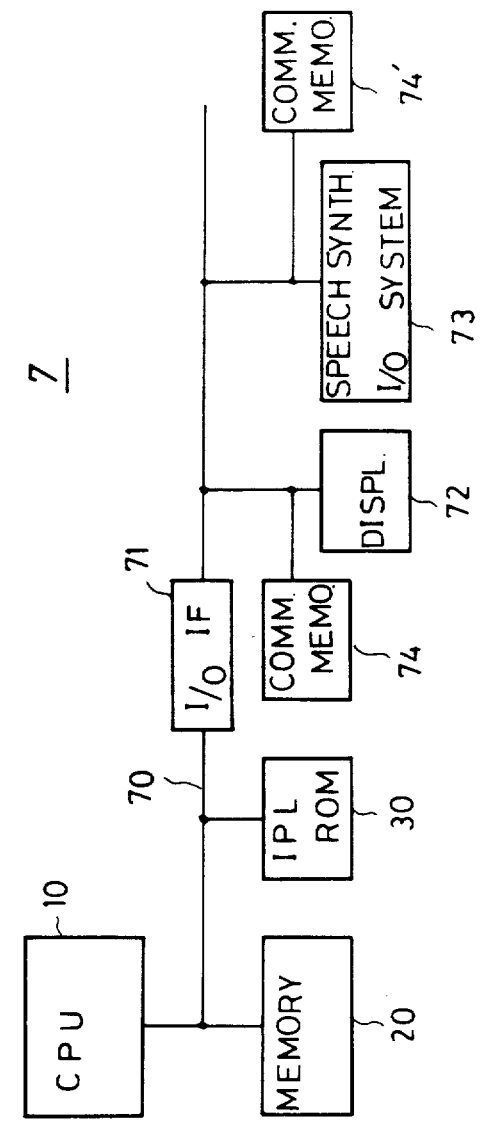
FIG. 7 illustrates a computer system which is an embodiment of this invention.

The address bus 201 and the data buses 301 and 305 which are coupled with the CPU 10 in the arrangement of FIG. 4A correspond to a bus 70 in a computer system 7 illustrated in FIG. 7. Accordingly, such buses are connected to, for example, a display unit 72 and a speech synthesis input/output system 73 through an input/output interface circuit 71 in the case of the present embodiment. The IPL ROM 30 has, for example, the four IPL programs as described before. Among them, the program IPL 1 is exclusively used for the display unit 71, and the program IPL 2 for the speech synthesis input/output system 73. The central processing unit 10 needs to communicate in conformity with a predetermined communication system in order to exchange information with such peripheral equipment.

By way of example, when starting the display unit 72, the CPU 10 first fetches the program IPL 1 from the ROM 30 for exclusive IPL use and then works upon the display unit 72. In outline, the communications between the CPU 10 and the display unit 72 conform with a communication system shown in FIG. 8. In this communication system, a shared or common memory 74 which stores therein a plurality of commands, a plurality of data, a plurality of status signals and a plurality of error status signals is used for the communication between the central processing unit 10 and the display unit 72. Thus, data transmission of comparatively high speed is carried out without the necessity for an acknowledge signal to be otherwise issued for, every transmission of 1 byte, and the hardware can be simplified.

More specifically, in the computer system 7 (FIG. 7) which has the central processing unit 10 and the peripheral equipment 72 and 73, common memories 74 and 74' are connected between the central processing unit 10 and the peripheral equipment 72 and 73 through data lines, address lines and control lines. The command signals, status signals, error status signals and data signals which are peculiar to the peripheral equipment are read and written by the use of the common memories, whereby the communications between the central processing unit and the peripheral equipment are executed.

By adopting such a communication system based on the common memories, the CPU 10 can exchange information comparatively simply when starting the respective peripheral equipment by the use of the IPL programs fetched from the ROM 30 for exclusive IPL use.

Figure 8:
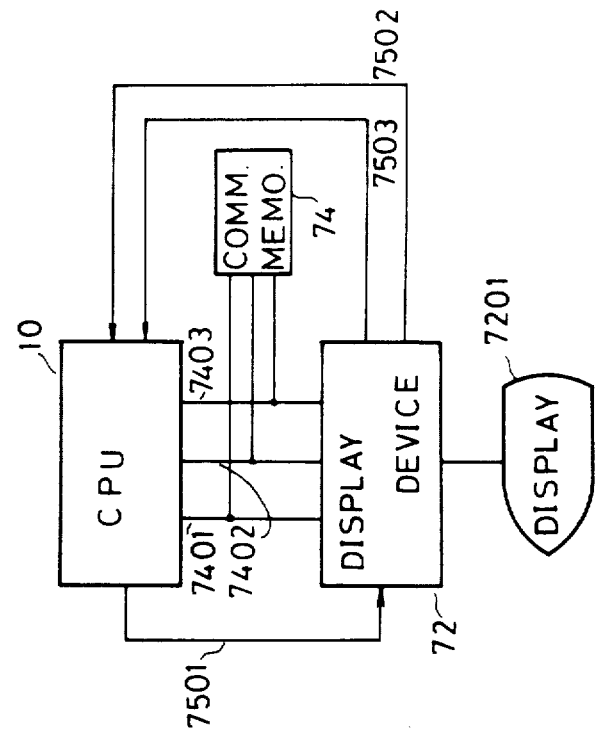
FIG. 8 is a block diagram illustrating a communication system in the embodiment of FIG. 7.

As illustrated in FIG. 8, the common memory 74 is disposed between the central processing unit 10 and the display unit 72. The address line 7401, data line 7402 and control line 7403 of the common memory 74 are connected to both the central processing unit 10 and the display unit 72. The central processing unit 10 and the display unit 72 are connected by a HALT signal line 7501, a BUSY signal line 7502 and an INTERRUPT signal line 7503.

The common memory 74 has its interior divided logically. For example, it includes an area for storing output instructions, an area for storing status signals indicative of the status of the display unit, and an area for storing error status signals. Accordingly, in order to send a certain data A from the central processing unit 10 to the display unit 72 and to display it on the latter, the central processing unit 10 appoints an address indicative of a write instruction in the common memory 74 and writes the data into this common memory. Thereafter, the display unit 72 loads the data by appointing the same address of the common memory 74 and displays it on a display panel 7201.

When writing the data A, the logical status of a busy signal 7502 indicating that the display unit 72 is in the busy status is first acknowledged. If the display unit 72 is in the ready status, that is, if it is in the status capable of loading the data, the central processing unit 10 transmits a halt signal 7501 to the display unit 72 to bring the input/output part of the display unit 72, connected to the address line 7401, data line 7402 etc., into a high impedance state, and then writes the data A into the common memory 74. Thereafter, the central processing unit 10 releases the halt signal 7501, and the display unit 72 loads the data from the common memory 74. Thus, the transmission of the data A from the central processing unit 10 to the display unit 72 is implemented.

In this manner, when transmitting data, the communications between the central processing unit 10 and the common memory 74 are permitted upon applying the halt signal 7501 from the central processing unit 10 to the display unit 72. Accordingly, it becomes possible to transmit large quantities of data besides the single data A in one step from the central processing unit 10 to the common memory 74. After the release of the halt signal 7501, the display unit 72 loads the large quantity of data from the common memory 74, and is thus allowed to display the data while loading it irrespective of the jobs being executed by the central processing unit 10. This signifies that the speed of the data transmission is rendered high.

An interrupt signal 7503, issued when the display unit 72 requests data, is a request signal making an interrupt request of the central processing unit 10 to acknowledge whether or not the data transmission between the central processing unit 10 and another peripheral equipment (for example, speech synthesis input/output system 73) or the job of the central processing unit 10 itself can be suspended, and to interrupt the central processing unit 10 so as to initiate the data transmission thereof to the display unit 72. In order to inform the central processing unit 10 of the status or error status of the display unit 72, various situations thereof are stored in the status area or error status area of the common memory 74 in advance, and the address of the common memory 74 corresponding to the particular situation is accessed from the display unit 72. A content thus appointed, that is, data representative of the specified situation is sent to the central processing unit 10. Alternatively, the central processing unit 10 is informed of the status of the display unit 72 in such a way that data representative of the status is written into the common memory 74 by a command issued from the display unit 72, and the central processing unit 10 fetches the written data.

When the display unit 72 is halted by the halt signal as described above, the central processing unit 10 can write data into the common memory 74. Therefore, the speed of the data transmission can be enhanced.

In accordance with the recent decentralization of functions within a system, a peripheral equipment such as a display has increasingly been functionally enhanced by installing a processor for exclusive use therein. By disposing the common memory 74 inside the display unit and coupling the former with the processor of the latter, the common memory 74 is permitted to be used multifariously.

Figure 9:
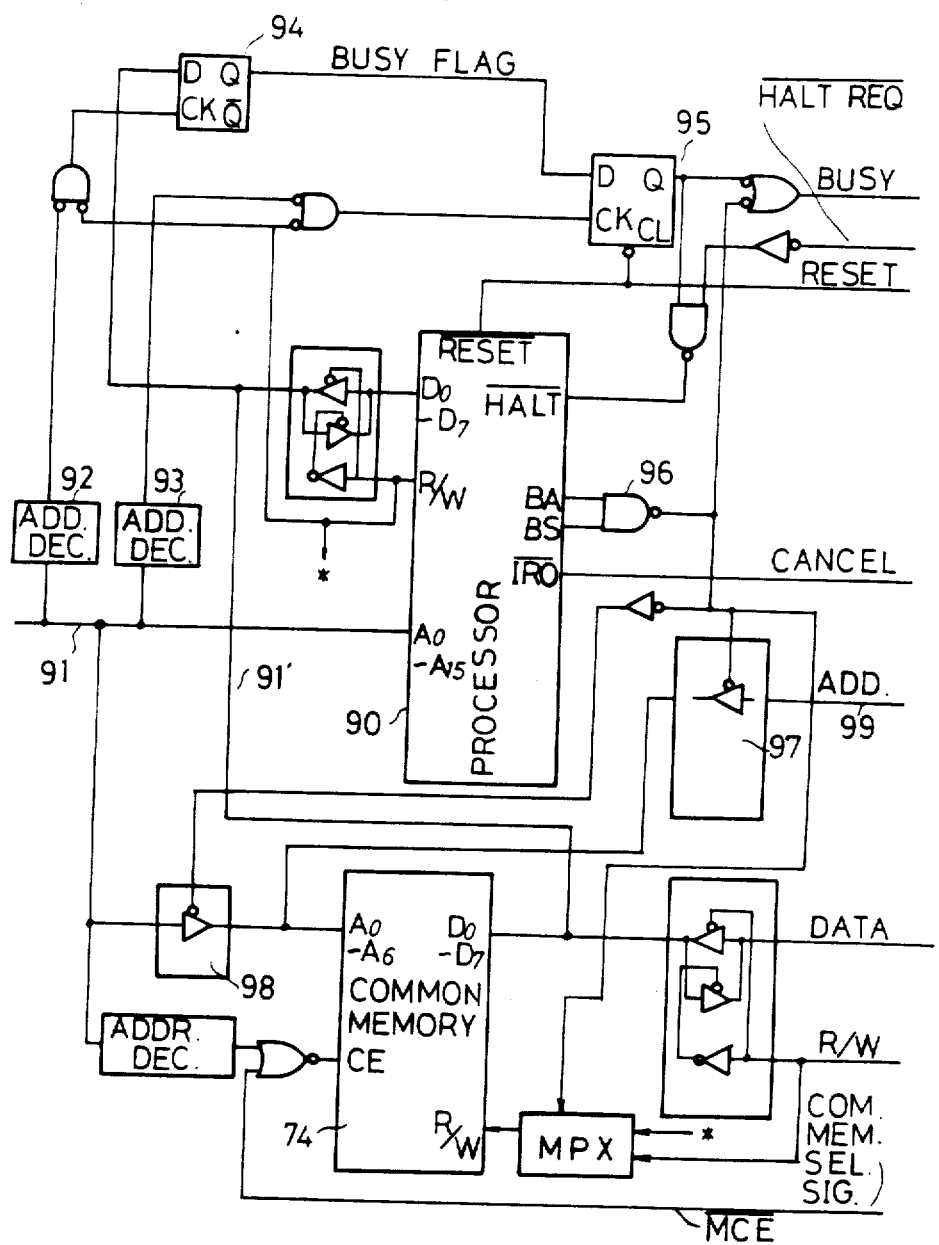
FIG. 9 is a circuit diagram illustrating a display system in the embodiment shown in FIG. 7.

The details of such a display system is shown in FIG. 9. The display system has as its basic constituents a processor 90 for exclusive use of the display system and a common memory 74 for storing communication information from a central processing unit 10. Further, it includes circuits for making control signals flow between display system and the central processing unit 10. When a reset signal $\overline{\text{RESET}}$ has become logic "0", the system is reset, and the processor 90 initiates a routine to clear the screen of a cathode-ray tube and also clear registers. Then, the processor 90 awaits a command from the CPU 10. The address bits of an internal address bus 91 are decoded by address decoders 92 and 93. When flip-flops 94 and 95 are released from producing a busy signal BUSY, the display system falls into the ready status, and the CPU 10 can access the common memory 74. In order to bring the processor 90 into the halt status, the CPU 10 makes a signal line HALT REQ the logic "0". When halted, the processor 90 changes a bus available signal BA and a bus state signal BS into logic "1" and renders the output of a NAND gate 96 "0". Thus, an address buffer 97 is put into the enabled status, while at the same time, an address buffer 98 for the internal address bus 91 is put into the disabled status. Then, the address $A_0$-$A_6$ of the common memory 74 receives an address over line 99 from the CPU. Herein, when a read/write signal R/W is in the read status, data DATA from the CPU 10 is written into the common memory 74 and transmitted to the processor 90 through a data bus 91'. This data is a command signal, a status signal, an error status signal, a data signal or the like which is peculiar to the display system. When the halt signal is released, the address buffer 97 falls into the disabled status and the address buffer 98 into the enabled status contrary to the foregoing, so that the address of the common memory 74 can be accessed by the processor 90. By accessing the common memory 74, the processor 90 can load thereinto the content of the common memory, i.e., the command signal or the status signal and can start operations exclusively for the display system.

Even when a cancel signal CANCEL is applied to the processor 90, the display can be canceled as an interrupt signal. Further, the chip enable terminal CE of the common memory 74 is supplied in the form of an OR with the signal obtained by decoding the information on the internal address bus 91 and a common memory select signal $\overline{\text{MCE}}$ transmitted from the CPU. Therefore, the chip is enabled from either side.

Now, when the memory 30 for exclusive IPL use has the program IPL 2 for the other peripheral equipment, namely, the speech synthesis input/output system 73 fetched through the IPL setting circuit 304 (FIG. 4A), the CPU 10 causes this system to start.

Figure 10:
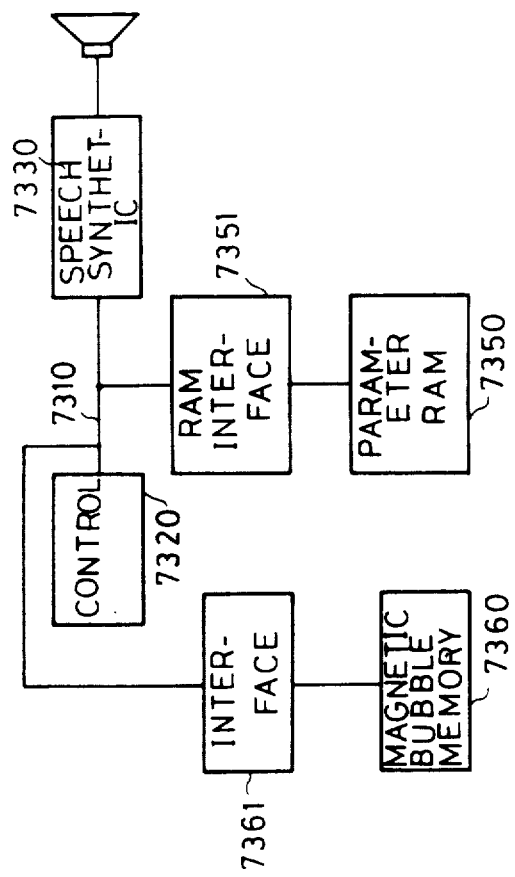
FIG. 10 is a block diagram illustrating a speech synthesis system which is still another embodiment of this invention.

FIG. 10 shows an embodiment of the speech synthesis input/output system 73. A control part or unit 7320 and a speech or noise synthesis unit 7330 comprising an LSI are connected to a data bus, an address bus and a control bus 7310 which are connected with a CPU 10. Further, a RAM 7350 for storing parameters therein is connected through an interface circuit 7351, and a magnetic bubble memory 7360 is connected through an interface circuit 7361.

Figure 11:
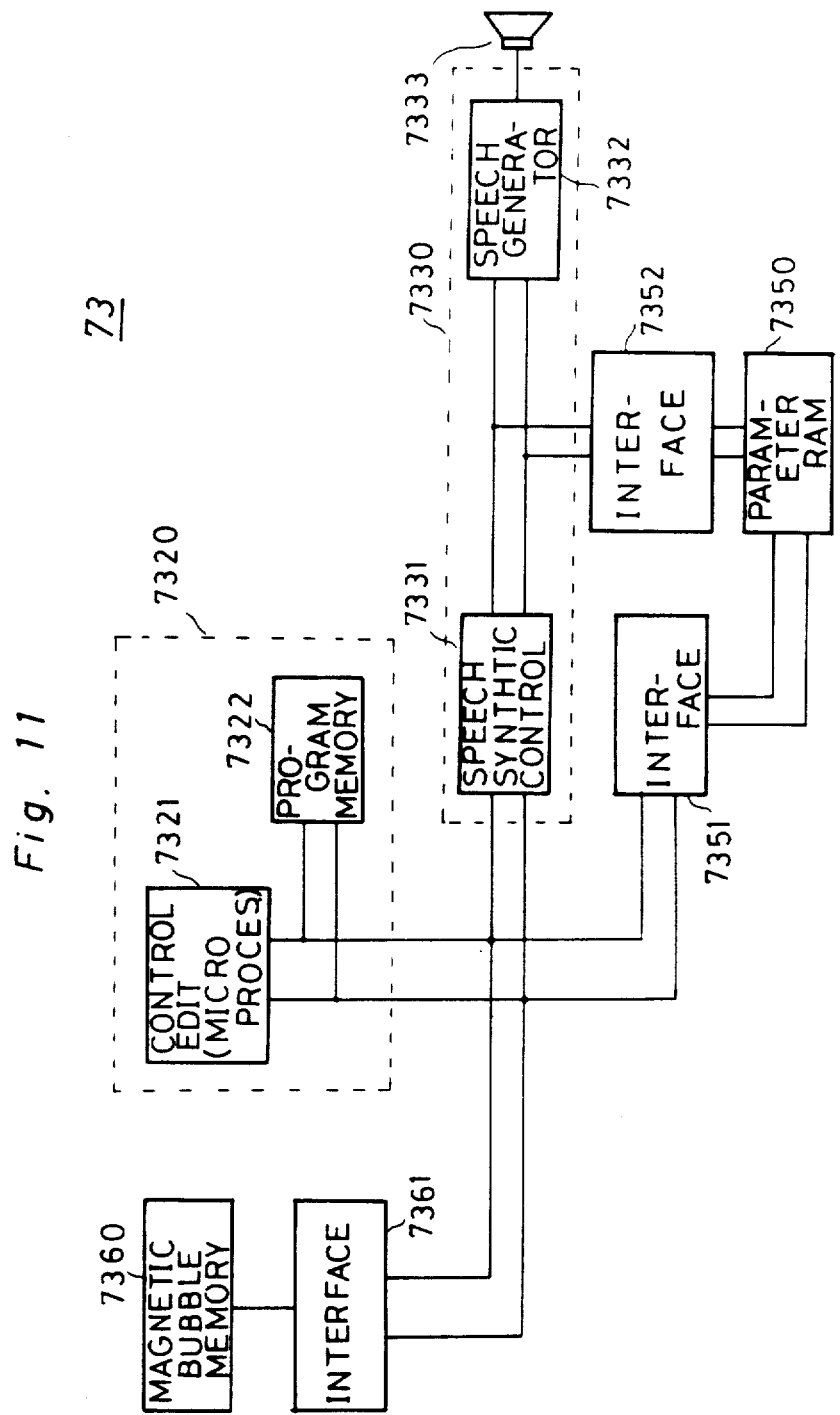
FIG. 11 illustrates the embodiment of FIG. 10 in more detail.

FIG. 11 is a block diagram in which the block diagram of FIG. 10 is depicted in more detail. A microprocessor 7321 and a program memory 7322 for controlling and editing the whole speech synthesis system are connected to the bus 7310. As stated above, the bus 7310 comprises the data bus, the address bus and the control bus. The speech synthesis unit 7330 comprises a speech synthesis control part 7331 and a speech generator 7332 connected with the former, and these components are respectively LSI's. The speech synthesis control part 7331 is connected to the bus 7310, and is controlled by the microprocessor 7321. The bus 7310 is connected to the CPU 10, and the CPU 10 starts the speech synthesis system 73 by the use of the record IPL 2. The magnetic bubble memory 7360 serves to store speech parameters therein, and is connected to the bus through the magnetic bubble memory interface 7361. The parameter RAM 7350 is connected to the bus through the parameter RAM interface circuit 7351, and is also connected to the speech synthesis unit 7330 through a speech synthesis RAM interface circuit 7352. The output of the speech generator 7332 is connected to a loudspeaker 7333.

In such a speech synthesis system having the magnetic bubble memory 7360 and the parameter RAM 7350, the parameters required for synthesizing the Japanese language are kept stored in the magnetic bubble memory 7360. The parameters are fetched from the magnetic bubble memory 7360 for monosyllables which comprise a sentence given from the editing or control unit or part 7320 (comprising parts 7321 and 7322), and are transmitted to the parameter RAM 7350 in the sequence in which they construct the sentence. Upon the end of the transmission, the control part 7320 starts the speech synthesis unit 7330 and thus provides a synthesized sound.

As described above, the control and edit part 7321 is constructed of the microprocessor. In accordance with words applied from the CPU 10 and information on the pitches thereof, the microprocessor fetches the parameters of the respective monosyllables in sequence of the application. It increases or decreases the frequencies of the parameters, and writes the resulting parameters into the parameter RAM 7350. After the microprocessor has written all the necessary parameters into the RAM, it starts the speech generator 7332 so as to emit the speech.

This embodiment employs the magnetic bubble memory for the storage of the speech parameters in contrast to the prior art which uses a ROM or a magnetic disk. The speech signals for any desired words can be produced with the magnetic bubble memory which can generate any desired speech of good quality as compared with the ROM and which is very compact and inexpensive as compared with the magnetic disk. That is, the embodiment comprising the microcomputer, magnetic bubble memory and speech synthesis system in combination can be made smaller in size than the prior art having a minicomputer, the magnetic disk and the speech synthesis system in combination.

In general, the prior-art method in which the parameters are stored in the ROM cannot change the intonation of synthesized speech. In contrast, with a device in which the parameters are rewritable, the pitches can be changed by rewriting parts of the parameters, and hence, the intonation can be changed. The program memory may be either a ROM in which a program is written, or a RAM which develops the program stored in the magnetic bubble memory.

This embodiment combines the speech synthesis unit 7330, the parameter RAM 7350 and the magnetic bubble memory 7360 which is, if necessary, in the form of a cassette, and can provide the speech synthesis system which can intonate any desired word and then emit the intonated word. Not only any desired sentence, but also fixed sentences having variations can be generated merely by replacing the magnetic bubble memory cassette.

Figure 12:
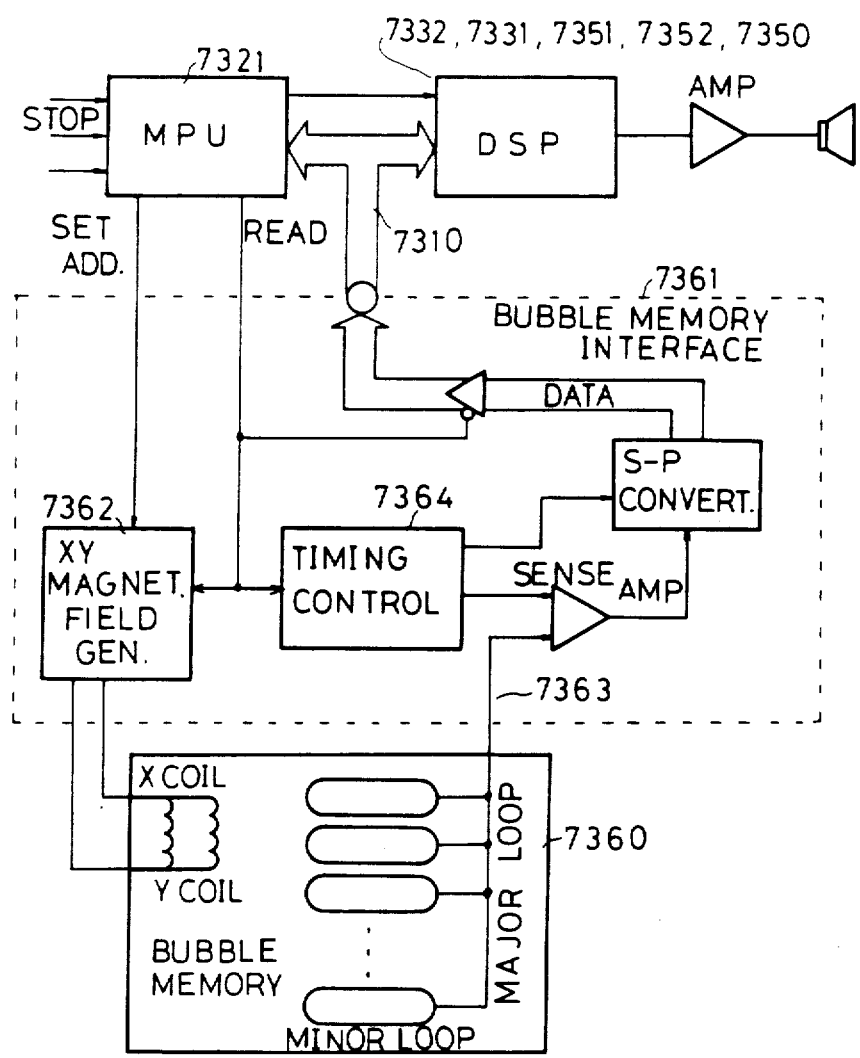
FIG. 12 is a block diagram illustrating a magnetic bubble memory and a magnetic bubble memory interface included in the embodiment.

The magnetic bubble memory 7360 and the magnetic bubble memory interface circuit 7361 in the speech synthesis system shown in FIG. 11 are illustrated in FIG. 12 in detail. When the microprocessor 7321 functioning as the control and edit part supplies the bubble memory interface circuit 7361 with a signal appointing the address of the the bubble memory 7360, a magnetic field generator circuit 7362 operates in the interface 7361 and causes X- and Y-coils of the bubble memory device 7360 to generate magnetic fields. When the memory contents of the bubble memory device appointed by the X- and Y-coils are fetched onto an output line 7363, it is subjected to a serial-parallel conversion at a suitable timing by a control signal from a timing control circuit 7364 which is controlled by the microprocessor 7321, whereupon the converted data is fetched onto the data bus 7310.

Figure 13:
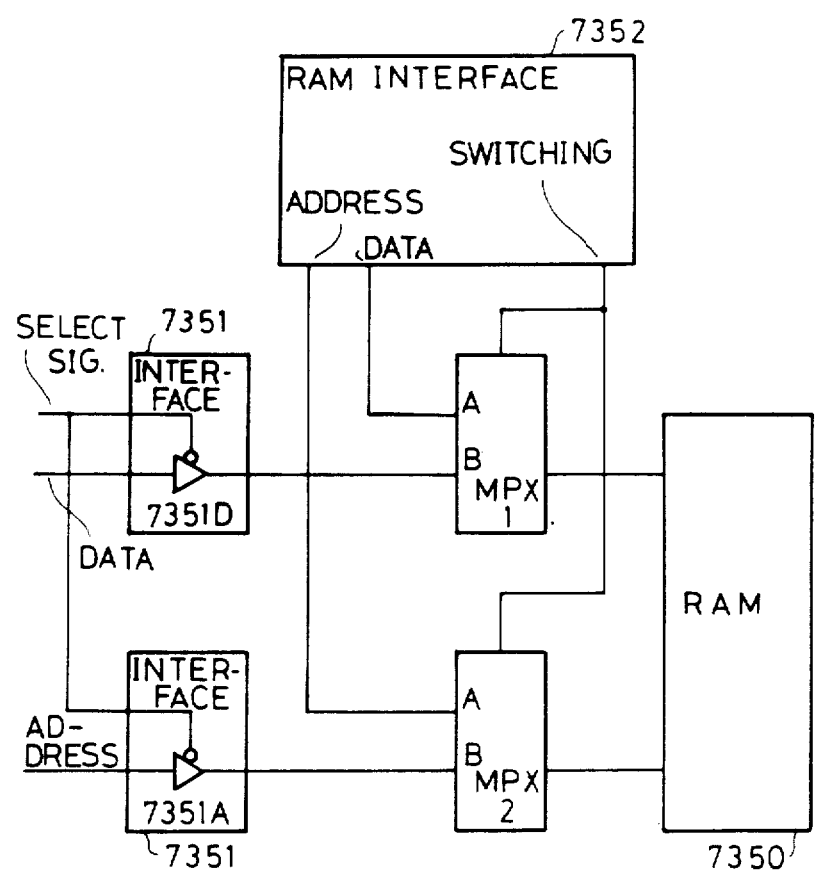
FIGS. 13 and 14 illustrate the detailed circuit of the main part of the embodiment shown in FIG. 10.
Figure 14:
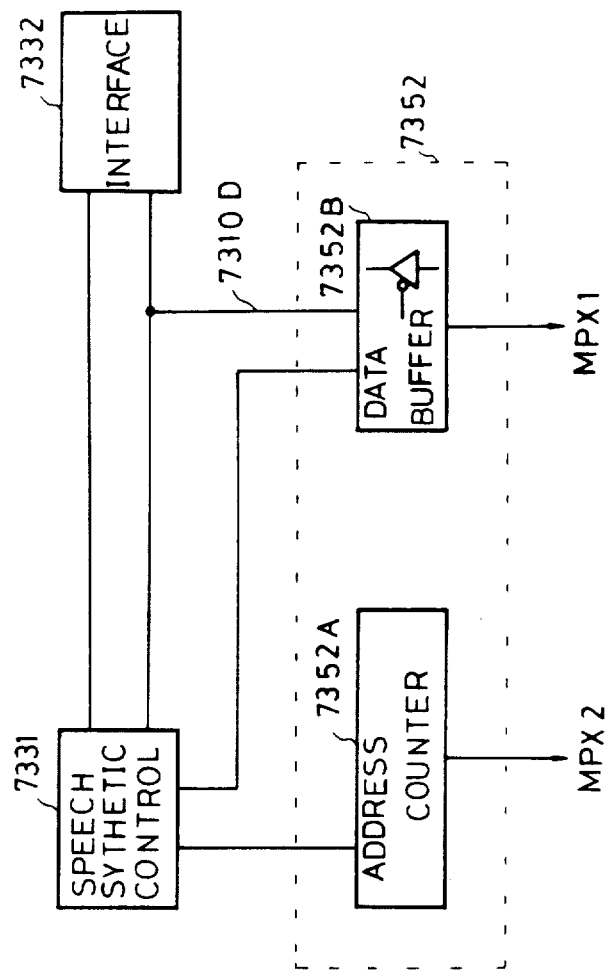

The details of the parameter RAM 7350 and the vicinities thereof are shown in FIGS. 13 and 14. The speech synthesis RAM interface 7352 sets an address sent from the speech synthesis control part 7331, into an address counter 7352A and thereafter sends it to the input A of a multiplexer MPX 2. Regarding data, the data of the data bus 7310D is sent to the input A of a multiplexer MPX 1 through a data buffer 7352B included in the RAM interface 7352. At this time, the enable operation of the buffer 7352B as to whether or not the data is passed is controlled by the speech synthesis control part 7331.

The input B of the multiplexer MPX 1 receives the data from the data bus 7310 through a buffer circuit 7351D disposed in the parameter RAM interface 7351.

Similarly, the input B of the multiplexer MPX 2 receives the address information from the address bus 7310 through a buffer circuit 7351A disposed in the parameter RAM interface 7351.

In response to a switching signal issued from the RAM interface 7352, the multiplexer MPX 1 receives either the input A or the input B and delivers an output which becomes the address signal of the parameter RAM 7350. In response to the switching signal from the RAM interface 7352, the multiplexer MPX 2 receives either the input A or the input B and is coupled with the write data line of the parameter RAM 7350.

I claim:

1. An information processor connected to a peripheral storage unit including execution programs, said information processor, comprising:

a central processing unit capable of executing a plurality of initial program loader programs after the operation of said central processing unit is initiated to load one of the execution programs;

an address bus operatively connected to said central processing unit and having upper and lower address terminals;

a data bus operatively connected to said central processing unit;

a first memory operatively connected to said data bus and said address bus, said central processing unit loading the one of the execution programs into said first memory in dependence upon one of the initial program loader programs;

a second memory, having upper and lower address terminals and operatively connected to said data bus, which stores said plurality of initial program loader programs therein, the lower address terminals of said second memory being connected to said central processing unit through said address bus, said central processing unit setting address bits of said second memory corresponding to the lower address terminals; and an initial program loader setting part, operatively connected to said second memory at said upper address terminals, which selects one of said plurality of initial program loader programs, the upper address terminals of said second memory being connected to said initial program loader setting part, said initial program loader setting part setting the address bits of said second memory corresponding to the upper address terminals, thereby selecting the one of the plurality of initial program loader programs, the selection being independent from the address on the upper address terminals of said address bus.

2. An information processor according to claim 1, wherein said second memory is a read only memory, and wherein said initial program loader setting part includes a plurality of switches which are connected to the upper address terminals of said read only memory in a 1-to-1 correspondence.

3. An information processor according to claim 2, wherein said information processor further includes peripheral equipment units, and wherein a number of said switches as well as said upper address terminals corresponds 1-to-1 to that of the number of peripheral equipment units.

4. An information processor, comprising:

a central processor having first and second address line sets for outputting first and second address data, respectively;

a first memory, operatively connected to said central processor by the first and second address line sets, for storing execution programs and data, for being addressed by the first and second address data and having an enable input;

a second memory, operatively connected to said central processor by the first address line set, having an enable input and memory storage areas each storing an initial program loader program;

memory storage area selecting means, operatively connected to said second memory, for selecting one of the memory storage areas independent from the memory storage area designated by the second address data, the first address data addressing within the selected memory storage area, said memory storage area selecting means comprising a switch, operatively connected to said second memory, for generating a storage area selection signal which selects one of the memory storage areas;

means, operatively connected to the second address line set of said central processor, for generating first and second enable signals in dependence upon the second address data, said first and second memories are enabled in dependence upon the first and second enable signals, respectively, the second enable signal being generated independent form the selection of one of the memory storage areas by said memory storage area selecting means;

an input/output interface operatively connected to said central processor, said first memory and said second memory;

peripheral equipment units, operatively connected to said input/output interface, each peripheral equipment unit requiring a different one of the execution programs for operation and said memory storage area selecting means selecting the initial program loader program necessary for loading the execution program for operating the selected peripheral equipment unit in dependence upon the peripheral equipment unit selected said initial program loader program loading the execution program into the first memory from the selected peripheral equipment unit and the execution program operating the selected peripheral equipment unit; and a common memory, operatively connected to said input/output interface and each peripheral equipment unit, for storing control and status signals for each peripheral equipment unit.

5. An information processor according to claim 4, wherein said second memory is a read only memory having the initial program loader programs permanently stored therein.

6. An information processor, comprising:

a central processing unit capable of executing initial program loader programs after operation of said central processing unit is initiated;

an address bus operatively connected to said central processing unit and having upper and lower address terminals;

a data bus operatively connected to said central processing unit;

a first memory operatively connected to said data bus and said address bus, said central processing unit loading execution programs into said first memory in dependence upon one of the initial program loader programs;

a second memory, operatively connected to said data bus, for storing the initial program loader programs, and having upper and lower address terminal, the lower address terminals being connected to said address bus;

an initial program loader setting part, operatively connected to said second memory at the upper address terminals, for selecting one of the initial program loader programs independent from the portion of the address on the upper address terminals of said address bus;

an input/output interface operatively connected to said address bus and said data bus; and peripheral equipment units, operatively connected to said input/output interface, each peripheral equipment unit and storing a difference execution program and requiring the different execution program for operation and said initial program loader part selecting the initial program loader program necessary for loading the execution program from the selected peripheral equipment unit and the loaded execution program operating the selected peripheral equipment unit.

* * * * *